(12) United States Patent
Kobayashi et al.

(10) Patent No.: US 11,454,186 B2
(45) Date of Patent: Sep. 27, 2022

(54) ERROR DIAGNOSIS DEVICE AND ERROR DIAGNOSIS METHOD

(71) Applicant: Isuzu Motors Limited, Tokyo (JP)

(72) Inventors: Yuusuke Kobayashi, Fujisawa (JP); Katsushi Shidomi, Fujisawa (JP); Kunio Noda, Fujisawa (JP); Daiki Ishii, Fujisawa (JP); Fumihiko Okazaki, Tokyo (JP)

(73) Assignee: Isuzu Motors Limited, Tokyo (JP)

( * ) Notice: Subject to any disclaimer, the term of this patent is extended or adjusted under 35 U.S.C. 154(b) by 10 days.

(21) Appl. No.: 17/040,336

(22) PCT Filed: Mar. 20, 2019

(86) PCT No.: PCT/JP2019/011638
§ 371 (c)(1),
(2) Date: Sep. 22, 2020

(87) PCT Pub. No.: WO2019/181995
PCT Pub. Date: Sep. 26, 2019

(65) Prior Publication Data
US 2021/0017927 A1    Jan. 21, 2021

(30) Foreign Application Priority Data

Mar. 22, 2018 (JP) .............................. JP2018-054326

(51) Int. Cl.
*F02D 41/22*      (2006.01)
*F02M 37/32*    (2019.01)
(Continued)

(52) U.S. Cl.
CPC ........... *F02D 41/22* (2013.01); *B01D 35/005* (2013.01); *B01D 35/143* (2013.01); *F02M 37/32* (2019.01);
(Continued)

(58) Field of Classification Search
CPC ....... F02D 41/22; F02D 2041/224–228; F02D 33/003; G01M 15/09
(Continued)

(56) References Cited

U.S. PATENT DOCUMENTS

2001/0025626 A1\* 10/2001 Antonioli .............. F02D 41/221
123/456
2005/0183699 A1\* 8/2005 Otani .................. F02D 41/3836
123/457
2009/0063012 A1 3/2009 Nakata et al.

FOREIGN PATENT DOCUMENTS

CN         105008697 A    10/2015
JP         2004324416 A   11/2004
(Continued)

OTHER PUBLICATIONS

International Search Report for International Application No. PCT/JP2019/011638; dated Jun. 18, 2019.

*Primary Examiner* — Robert A Werner

(57) ABSTRACT

The error diagnosis device has: an input unit that receives a downstream pressure value and an upstream pressure value, said downstream pressure value being detected on the downstream side of a fuel pump and said upstream pressure value being detected on the upstream side of the fuel pump; and a determination unit that, if the downstream pressure value is less than a preset first threshold value, determines whether or not the upstream pressure value is less than a preset second threshold value. The determination unit determines that an error has occurred further upstream than the fuel pump if the upstream pressure value is less than the second threshold value and determines that an error has occurred in the fuel pump if the upstream pressure value is at least the second threshold value.

6 Claims, 2 Drawing Sheets

(51) Int. Cl.
  *B01D 35/00* (2006.01)
  *B01D 35/143* (2006.01)
  *F02M 59/46* (2006.01)
  *G07C 5/08* (2006.01)
  *F02M 37/04* (2006.01)

(52) U.S. Cl.
  CPC ........... *F02M 59/46* (2013.01); *G07C 5/0808* (2013.01); *F02D 2041/224* (2013.01); *F02D 2200/0602* (2013.01); *F02M 37/04* (2013.01)

(58) Field of Classification Search
  USPC ............. 701/114; 73/114.38, 114.41, 114.43
  See application file for complete search history.

(56) References Cited

FOREIGN PATENT DOCUMENTS

| | | | |
|---|---|---|---|
| JP | 2005009393 A | | 1/2005 |
| JP | 2005009398 A | | 1/2005 |
| JP | 2005233125 A | | 9/2005 |
| JP | 2009057928 A | | 3/2009 |
| JP | 2011089526 A | | 5/2011 |
| JP | 2014001688 A | | 1/2014 |
| JP | 2015086812 A | * | 5/2015 |
| JP | 2015086812 A | | 5/2015 |
| WO | 2015032409 A1 | | 3/2015 |

* cited by examiner

ERROR DIAGNOSIS DEVICE AND ERROR DIAGNOSIS METHOD

CROSS REFERENCE TO RELATED APPLICATIONS

This is the U.S. national stage of application No. PCT/JP2019/011638, filed on Mar. 20, 2019. Priority under 35 U.S.C. § 119(a) and 35 U.S.C. § 365(b) is claimed from Japanese Application No. 2018-054326, filed Mar. 22, 2018, the disclosure of which is also incorporated herein by reference.

TECHNICAL FIELD

The present disclosure relates to a malfunction diagnosis device for diagnosing a malfunction of a fuel supply system and a method for diagnosing a malfunction of the fuel supply system.

BACKGROUND ART

A conventional fuel supply system that supplies fuel stored in a fuel tank to the internal combustion engine side (for example, a common rail) is known (see, for example, Patent Literature (hereinafter referred to as "PTL") 1). In the fuel supply system, for example, the fuel pumped up from the fuel tank by a feed pump passes through a fuel filter, and after the flow rate is adjusted by a flow control valve, the fuel is pressurized and discharged to the internal combustion engine side by a high pressure pump.

CITATION LIST

Patent Literature

PTL 1
Japanese Patent Application Laid-Open No. 2009-057928

SUMMARY OF INVENTION

Technical Problem

When a malfunction occurs in the above described fuel supply system, it is unfortunately necessary to disassemble and investigate the fuel supply system to identify the location of the malfunction.

An object of the present disclosure is to provide a malfunction diagnosis device and a method for diagnosing a malfunction which are capable of identifying the location of the malfunction with no need of disassembly.

Solution to Problem

A malfunction diagnosis device according to an aspect of the present disclosure includes an input section that receives a downstream pressure value and an upstream pressure value in a fuel supply system, the downstream pressure value being detected on a downstream side of a fuel pump that pressurizes and discharges fuel pumped up from a storage section in the fuel supply system, the upstream pressure value being detected on an upstream side of the fuel pump; and a determination section that determines, when the downstream pressure value is less than a preset first threshold value, whether the upstream pressure value is less than a preset second threshold value, in which the determination section determines that a malfunction has occurred on the upstream side of the fuel pump, when the upstream pressure value is less than the second threshold value, and the determination section determines that a malfunction has occurred at the fuel pump, when the upstream pressure value is equal to or more than the second threshold value.

A method for diagnosing a malfunction according to an aspect of the present disclosure includes: receiving a downstream pressure value and an upstream pressure value in a fuel supply system, the downstream pressure value being detected on a downstream side of a fuel pump that pressurizes and discharges fuel pumped up from a storage section in the fuel supply system, the upstream pressure value being detected on an upstream side of the fuel pump; determining whether the upstream pressure value is less than a preset second threshold value, when the downstream pressure value is less than a preset first threshold value; and determining that a malfunction has occurred on the upstream side of the fuel pump, when the upstream pressure value is less than the second threshold value, and determining that a malfunction has occurred at the fuel pump, when the upstream pressure value is equal to or more than the second threshold value.

Advantageous Effects of Invention

The present disclosure is capable of identifying the location of a malfunction with no need of disassembly.

DESCRIPTION OF EMBODIMENTS

Hereinafter, embodiments of the present disclosure will be described in detail with reference to the drawings.

A configuration of fuel supply system 1 and malfunction diagnosis device 100 according to an embodiment of the present disclosure will be described with reference to FIG. 1.

Figure 1:
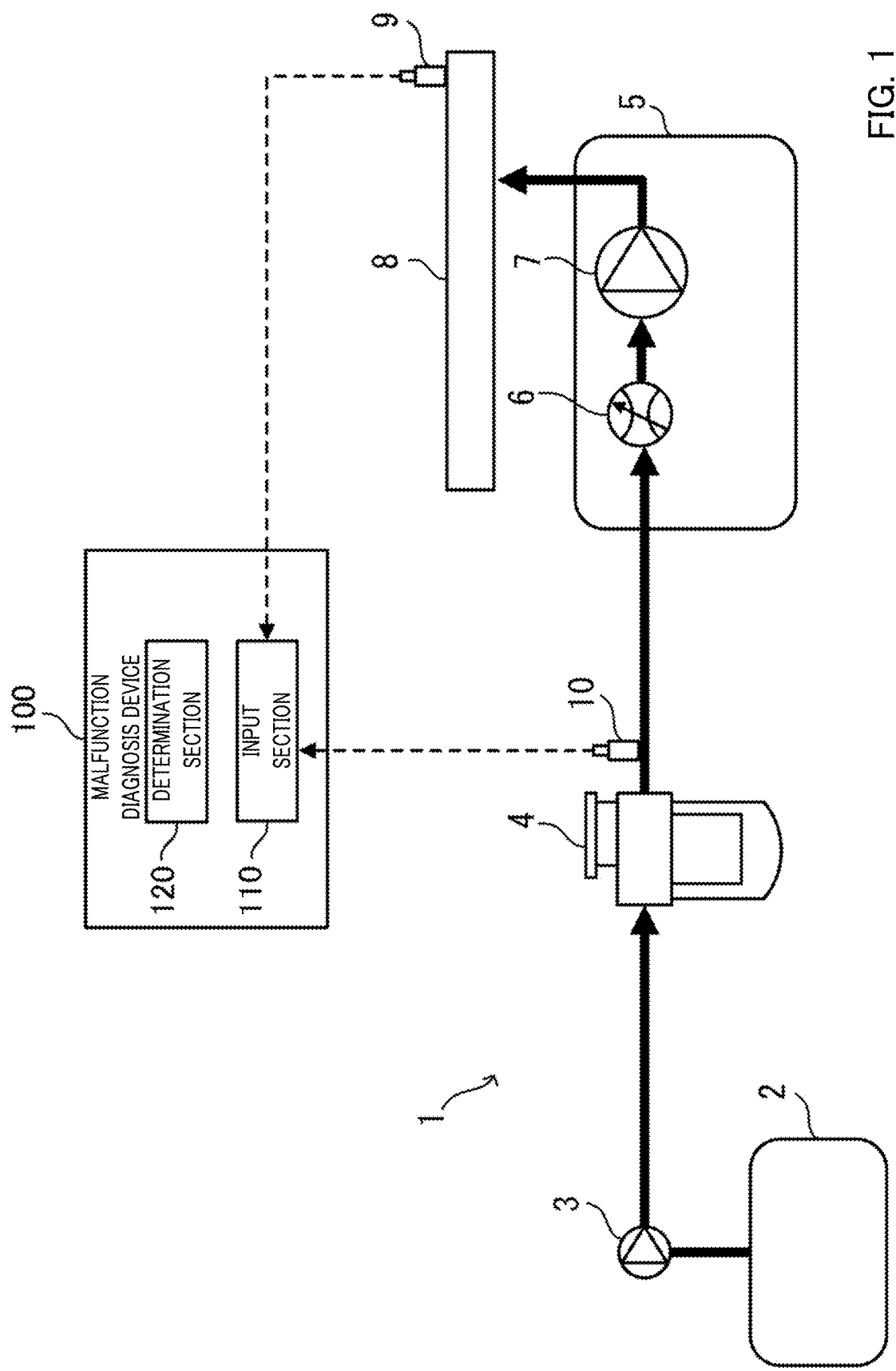
FIG. 1 illustrates an exemplary configuration of a fuel supply system and a malfunction diagnosis device according to an embodiment of the present disclosure.

FIG. 1 illustrates an exemplary configuration of fuel supply system 1 and malfunction diagnosis device 100. In FIG. 1, the solid arrows show the flow of fuel and the broken arrows show the flow of electrical signals.

Fuel supply system 1 and malfunction diagnosis device 100 illustrated in FIG. 1 are mounted on a vehicle provided with an internal combustion engine (for example, a diesel engine) driven by fuel (for example, light oil). Fuel supply system 1 is for supplying fuel to the internal combustion engine, and malfunction diagnosis device 100 is for identifying the occurrence of a malfunction and the location of the malfunction in fuel supply system 1.

The configuration of fuel supply system 1 will now be described.

Fuel supply system 1 includes fuel tank 2 for storing fuel (an example of a storage section), feed pump 3 for pumping up the fuel from fuel tank 2, fuel filter 4 for collecting foreign matters contained in the fuel, and fuel pump 5 for discharging the fuel to common rail 8.

Fuel pump 5 includes flow control valve 6 for adjusting the flow rate of the fuel, and high pressure pump 7 for pressurizing the fuel until the fuel has a high pressure.

The opening of flow control valve 6 is controlled by a not-illustrated control device (for example, electric control unit or ECU) so that the pressure (common rail pressure) of the fuel stored in common rail 8 becomes a target common rail pressure determined based on the operating condition (for example, the rotation speed of the internal combustion engine and the accelerator opening).

Common rail 8 is provided with first pressure sensor 9 for detecting the above described common rail pressure and outputting a value indicating the detected common rail pressure to malfunction diagnosis device 100 as needed. This pressure value is detected on the downstream side of fuel pump 5 by first pressure sensor 9, and thus is hereinafter referred to as the "downstream pressure value."

On a side downstream of fuel filter 4 and upstream of fuel pump 5, second pressure sensor 10 is provided for detecting the pressure of the fuel on the side downstream of fuel filter 4 and upstream of fuel pump 5, and for outputting a value indicating the detected pressure to malfunction diagnosis device 100 as needed. This pressure value is detected on the upstream side of fuel pump 5 by second pressure sensor 10, and thus is hereinafter referred to as the "upstream pressure value."

FIG. 1 illustrates a configuration with feed pump 3 provided on the upstream side of fuel filter 4, but the present embodiment is not limited to the configuration, and feed pump 3 may be provided, for example, at fuel pump 5.

A fuel filter different from fuel filter 4 may be provided on the upstream side of fuel filter 4 (for example, between fuel tank 2 and feed pump 3) in the configuration illustrated in FIG. 1.

In the fuel supply system 1 configured as described above, fuel stored in fuel tank 2 is pumped up by feed pump 3, and after foreign matters are collected by fuel filter 4, the fuel flows into fuel pump 5. The fuel whose flow rate is adjusted by flow control valve 6 based on the operating condition of the internal combustion engine is pressurized to have a high pressure by high pressure pump 7 and discharged to common rail 8. The fuel stored in common rail 8 is supplied to the injector (not illustrated) of the internal combustion engine.

The configuration of malfunction diagnosis device 100 will now be described.

Malfunction diagnosis device 100 includes input section 110 and determination section 120.

Malfunction diagnosis device 100 includes, for example, a central processing unit (CPU), a storage medium such as a read only memory (ROM) that stores control programs, a working memory such as a random access memory (RAM), and a communication circuit, although they are not illustrated in the drawings. The function of determination section 120 described below is realized by the CPU executing a computer program.

Input section 110 receives the downstream pressure value from first pressure sensor 9 as needed. Input section 110 also receives the upstream pressure value from second pressure sensor 10 as needed.

Determination section 120 determines whether the downstream pressure value is less than a preset first threshold value. The first threshold value is, for example, a pressure value determined according to the rotation speed of the internal combustion engine and the accelerator opening. An example of the first threshold value is the above described target common rail pressure. The first threshold value is set based on the results of experiments, simulations and the like performed in advance.

Input section 110 may receive the first threshold value from another device (for example, an ECU), or determination section 120 may calculate the first threshold value. The calculation by determination section 120 is, for example, as follows. Input section 110 receives a detected value from a crank angle sensor (not illustrated) and a detected value from an accelerator opening sensor (not illustrated). Determination section 120 then calculates the rotation speed of the internal combustion engine based on the detected crank angle. Determination section 120 then identifies a target common rail pressure corresponding to the calculated rotation speed of the internal combustion engine and the detected accelerator opening from the map in which target common rail pressures are given according to rotation speeds of the internal combustion engine and accelerator openings. The target common rail pressure is used as the first threshold value.

Determination section 120 also determines whether the upstream pressure value is less than a preset second threshold value when the downstream pressure value is less than the first threshold value. The second threshold value is, for example, a pressure value determined according to the rotation speed of the internal combustion engine. The second threshold value is set based on the results of experiments, simulations and the like performed in advance.

Input section 110 may receive the second threshold value from another device (for example, an ECU), or determination section 120 may calculate the second threshold value. The calculation by determination section 120 is, for example, as follows. Input section 110 receives a detected value from a crank angle sensor (not illustrated). Determination section 120 then calculates the rotation speed of the internal combustion engine based on the detected crank angle. Determination section 120 then identifies a pressure corresponding to the calculated rotation speed of the internal combustion engine from the map in which pressures are given according to rotation speeds of the internal combustion engine. The pressure is used as the second threshold value.

When the upstream pressure value is less than the second threshold value, determination section 120 determines that a malfunction has occurred on the upstream side of fuel pump 5 (for example, at fuel filter 4 or a pipe (or pipes) between fuel tank 2 and fuel pump 5).

On the other hand, when the upstream pressure value is equal to or more than the second threshold value, determination section 120 determines that a malfunction has occurred at fuel pump 5.

Determination section 120 outputs or wirelessly transmits diagnostic result information indicating a location where the malfunction occurs (fuel pump 5 or the upstream side of fuel pump 5) to a predetermined device.

The predetermined device may be, for example, a display device or a storage device mounted on the vehicle, or a server device installed outside the vehicle.

The diagnostic result information output to the storage device or the server device is used by, for example, the manufacturer of the device in which the malfunction occurs, or the repairer who repairs or replaces the device in which the malfunction occurs. When the predetermined device is a server device, for example, the diagnostic result information is transmitted from the server device to a terminal of the repairer, and thus the repairer can understand the location of the malfunction before the vehicle to be repaired is brought in.

This is the end of the description for fuel supply system 1 and malfunction diagnosis device 100.

Figure 2:
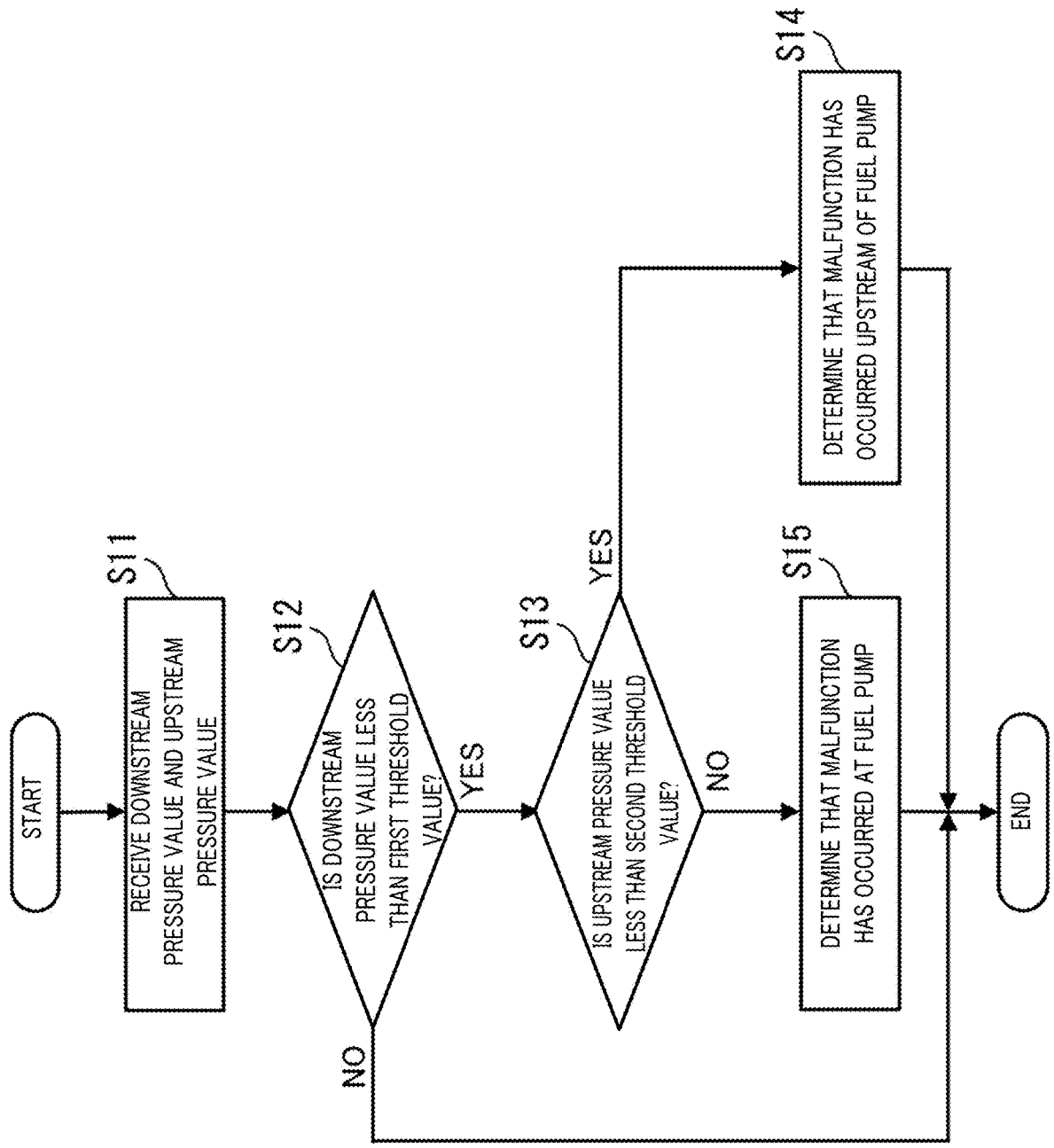
FIG. 2 illustrates an exemplary operation of the malfunction diagnosis device according to the embodiment of the present disclosure.

The operation of malfunction diagnosis device 100 will now be described with reference to FIG. 2. FIG. 2 illustrates an exemplary operation of malfunction diagnosis device 100.

Input section 110 receives a downstream pressure value from first pressure sensor 9 and a upstream pressure value from second pressure sensor 10 (step S11).

Determination section 120 then determines whether the downstream pressure value is less than a first threshold value (step S12).

When the downstream pressure value is equal to or more than the first threshold value (step S12: NO), the flow ends.

On the other hand, when the downstream pressure value is less than the first threshold value (step S12: YES), determination section 120 determines whether the upstream pressure value is less than a second threshold value (step S13).

When the upstream pressure value is less than the second threshold value (step S13: YES), determination section 120 determines that a malfunction has occurred on the upstream side of fuel pump 5 (step S14).

On the other hand, when the upstream pressure value is equal to or more than the second threshold value (step S13: NO), determination section 120 determines that a malfunction has occurred at fuel pump 5 (step S15).

Determination section 120 then outputs or wirelessly transmits the diagnostic result information indicating the determination result to a predetermined device.

This is the end of the description for the operation of malfunction diagnosis device 100.

As described in detail above, malfunction diagnosis device 100 of the present embodiment determines whether the upstream pressure value is less than the second threshold value when the downstream pressure value is less than the first threshold value. Malfunction diagnosis device 100 determines that a malfunction has occurred on the upstream side of fuel pump 5 when the upstream pressure value is less than the second threshold value, and that the malfunction has occurred at fuel pump 5 when the upstream pressure value is equal to or more than the second threshold value. When a malfunction occurs in fuel supply system 1, the location of the malfunction in fuel supply system 1 can be identified without disassembling fuel supply system 1 for the investigation. As a result, time and cost can be reduced compared to the identification of the location of the malfunction by disassembling.

The present disclosure is not limited to the above described embodiment, and may be appropriately modified and implemented without departing from the spirit of the present disclosure. Hereinafter, modifications will be described.

[Modification 1]

Malfunction diagnosis device 100 is mounted on a vehicle as an example in the embodiment, but malfunction diagnosis device 100 may be provided outside the vehicle.

For example, a wireless communication device mounted on a vehicle (for example, a device used in telematics) wirelessly transmits an upstream pressure value received from first pressure sensor 9 and a downstream pressure value received from second pressure sensor 10 to malfunction diagnosis device 100 via a predetermined network in this modification. Malfunction diagnosis device 100 uses the received upstream pressure value and downstream pressure value to perform the above described determination processes.

[Modification 2]

Fuel supply system 1 described in the embodiment may be configured such that fuel can be supplied to an injector for injecting the fuel into an exhaust pipe (hereinafter referred to as an exhaust pipe injector).

For example, a branch pipe branching from one of pipes connecting fuel tank 2 and fuel pump 5 is provided, and the branch pipe is connected to the exhaust pipe injector in this modification. This modification allows the fuel to be supplied to the exhaust pipe injector via the branch pipe.

The branch pipe may be provided, for example, on the upstream side or the downstream side of fuel filter 4.

In addition, the branch pipe may be provided with a shutoff valve, a third pressure sensor, a dosing valve, a fourth pressure sensor and an exhaust pipe injector in this order. The third pressure sensor detects the pressure of the fuel between the shutoff valve and the dosing valve. The fourth pressure sensor detects the pressure of the fuel between the dosing valve and the exhaust pipe injector. The pressure value detected by the third pressure sensor or the fourth pressure sensor may be used in place of the upstream pressure value described above.

[Modification 3]

When a malfunction is determined to have occurred on the upstream side of fuel pump 5 in the embodiment, the location of the malfunction on the upstream side of the fuel pump 5 may be further determined. This modification will be described below.

A fifth pressure sensor for detecting the pressure of the fuel is further provided on a side downstream of feed pump 3 and upstream of fuel filter 4 in the fuel supply system 1 illustrated in FIG. 1.

Input section 110 receives a pressure value detected by the fifth pressure sensor (hereinafter, referred to as the most upstream pressure value) in addition to the above described downstream pressure value and upstream pressure value.

When a malfunction is determined to have occurred on the upstream side of fuel pump 5, determination section 120 determines whether the most upstream pressure value is less than a third threshold value. The third threshold value is, for example, a pressure value determined according to the rotation speed of the internal combustion engine.

When the most upstream pressure value is less than the third threshold value, determination section 120 determines that a malfunction has occurred on the upstream side of fuel filter 4 (for example, at feed pump 3 or pipes between fuel tank 2 and fuel filter 4).

On the other hand, when the most upstream pressure value is equal to or more than the third threshold value, determination section 120 determines that a malfunction has occurred at fuel filter 4.

Determination section 120 then outputs or wirelessly transmits diagnostic result information indicating a location where the malfunction occurs (fuel filter 4 or the upstream side of fuel filter 4) to a predetermined device.

The present modification is thus capable of identifying the location of a malfunction on the upstream side of fuel pump 5.

This is the end of the description for the modifications. Each modification may be implemented in combination as appropriate.

INDUSTRIAL APPLICABILITY

The malfunction diagnosis device and the method for diagnosing a malfunction of the present disclosure are particularly advantageous for the identification of the location of the malfunction in a fuel supply system.

The invention claimed is:

1. A malfunction diagnosis device, comprising:
an input that receives a downstream pressure value, an upstream pressure value, and a most upstream pressure value in a fuel supply system, the downstream pressure value being detected on a downstream side of a fuel pump that pressurizes and discharges fuel pumped up by a feed pump from a storage section in the fuel supply system, the upstream pressure value being detected on an upstream side of the fuel pump, the most upstream pressure value being detected on an upstream side of a fuel filter and a downstream side of the feed pump, the fuel filter being provided on an upstream side of the fuel pump, the fuel filter collecting foreign matters contained in the fuel;
a processor that determines, when the downstream pressure value is less than a preset first threshold value, whether the upstream pressure value is less than a preset second threshold value, and that determines, when the upstream pressure value is less than the preset second threshold value, whether the most upstream pressure value is less than a preset third threshold value, the preset third threshold value being determined according to a rotation speed of an internal combustion engine,
wherein the processor determines that a malfunction has occurred on the upstream side of the fuel pump, when the upstream pressure value is less than the second threshold value,
the processor determines that a malfunction has occurred at the fuel pump, when the upstream pressure value is equal to or more than the second threshold value,
the processor determines that a malfunction has occurred at an upstream side of the fuel filter, when the most upstream pressure value is less than the third threshold value,
the processor determines that a malfunction has occurred at the fuel filter, when the most upstream pressure value is equal to or more than the third threshold value, and
the processor outputs diagnostic result information indicating a location where the malfunction occurs to another device.

2. The malfunction diagnosis device according to claim 1, wherein:
the downstream pressure value is a pressure value of the fuel in a common rail that stores under pressure the fuel discharged from the fuel pump.

3. The malfunction diagnosis device according to claim 1, wherein:
the upstream pressure value is a pressure value of the fuel flowing between the fuel pump and the fuel filter.

4. The malfunction diagnosis device according to claim 1, wherein:
the fuel pump includes
a flow control valve that adjusts a flow rate of the fuel, and
a high pressure pump that pressurizes the fuel whose flow rate is adjusted.

5. The malfunction diagnosis device according to claim 1, wherein the upstream side of the fuel filter is a position at the feed pump or at pipes between the storage section and the fuel filter.

6. A method for diagnosing a malfunction, comprising:
receiving a downstream pressure value, an upstream pressure value, and a most upstream pressure value in a fuel supply system, the downstream pressure value being detected on a downstream side of a fuel pump that pressurizes and discharges fuel pumped up by a feed pump from a storage section in the fuel supply system, the upstream pressure value being detected on an upstream side of the fuel pump, the most upstream pressure value being detected on an upstream side of a fuel filter and a downstream side of the feed pump, the fuel filter being provided on an upstream side of the fuel pump, the fuel filter collecting foreign matters contained in the fuel;
determining, when the downstream pressure value is less than a preset first threshold value, whether the upstream pressure value is less than a preset second threshold value;
determining, when the upstream pressure value is less than the preset second threshold value, whether the most upstream pressure value is less than a preset third threshold value, the preset third threshold value being determined according to a rotation speed of an internal combustion engine;
determining that a malfunction has occurred on the upstream side of the fuel pump, when the upstream pressure value is less than the second threshold value, and determining that a malfunction has occurred at the fuel pump, when the upstream pressure value is equal to or more than the second threshold value;
determining that a malfunction has occurred at an upstream side of the fuel filter, when the most upstream pressure value is less than the third threshold value, and determining that a malfunction has occurred at the fuel filter, when the most upstream pressure value is equal to or more than the third threshold value; and
outputting diagnostic result information indicating a location where the malfunction occurs to another device.

* * * * *